(12) United States Patent
Wang et al.

(10) Patent No.: US 10,682,860 B2
(45) Date of Patent: Jun. 16, 2020

(54) INK CARTRIDGE, INK CARTRIDGE CHIP, AND SHORT-CIRCUIT DETECTION METHOD OF CHIP

(71) Applicant: APEX MICROELECTRONICS CO., LTD, Zhuhai (CN)

(72) Inventors: Zuo Wang, Zhuhai (CN); Weichen Liu, Zhuhai (CN)

(73) Assignee: APEX MICROELECTRONICS CO., LTD, Zhuhai (CN)

( * ) Notice: Subject to any disclaimer, the term of this patent is extended or adjusted under 35 U.S.C. 154(b) by 0 days.

(21) Appl. No.: 16/181,796

(22) Filed: Nov. 6, 2018

(65) Prior Publication Data

US 2019/0070859 A1  Mar. 7, 2019

Related U.S. Application Data

(63) Continuation of application No. 15/606,966, filed on May 26, 2017, now Pat. No. 10,155,393, which is a continuation of application No. PCT/CN2014/073323, filed on Mar. 12, 2014.

(30) Foreign Application Priority Data

Dec. 26, 2013 (CN) .......................... 2013 1 0734008

(51) Int. Cl.
*B41J 2/175* (2006.01)
*H02H 7/20* (2006.01)

(52) U.S. Cl.
CPC ......... *B41J 2/1753* (2013.01); *B41J 2/17546* (2013.01); *B41J 2/17553* (2013.01); *H02H 7/20* (2013.01)

(58) Field of Classification Search
CPC .... B41J 2/17546; B41J 2/1753; B41J 2/1752; B41J 2/17553; B41J 2/17526; B41J 2002/14491; B41J 2/175; H02H 7/20
See application file for complete search history.

(56) References Cited

U.S. PATENT DOCUMENTS

2012/0056920 A1\* 3/2012 Asauchi ................. B41J 2/1753
347/1

\* cited by examiner

*Primary Examiner* — Jannelle M Lebron
(74) *Attorney, Agent, or Firm* — Anova Law Group, PLLC

(57) ABSTRACT

Disclosed is an ink cartridge, ink cartridge chip, and short-circuit detection method of chip. The ink cartridge chip comprises: a short-circuit detection terminal, which is disposed between a connecting terminal to be detected and one or more connecting terminals other than the connecting terminal to be detected; a short-circuit detection and processing unit, which is connected to a voltage division and power supply unit and one or more connecting terminals other than the connecting terminal to be detected; and a voltage division and power supply unit, which is connected to the short-circuit detection and processing unit and the connecting terminal to be detected, for dividing voltage from the connecting terminal to be detected and transmitting an obtained low voltage to the short-circuit detection and processing unit. The present disclosure is able to reduce costs and satisfy long-term use of short-circuit detection in the ink cartridge chips.

14 Claims, 10 Drawing Sheets

INK CARTRIDGE, INK CARTRIDGE CHIP, AND SHORT-CIRCUIT DETECTION METHOD OF CHIP

CROSS-REFERENCE TO RELATED APPLICATION

The present application is a continuation of U.S. patent application Ser. No. 15/606,966, filed on May 26, 2017, which is a continuation of International Application No. PCT/CN2014/073323, filed on Mar. 12, 2014, which claims the priority to and benefits Chinese Patent Application No. 201310734008.6, filed with the State Intellectual Property Office of the People's Republic of China (SIPO) on Dec. 26, 2013, the content of all of which is incorporated by reference herein.

TECHNICAL FIELD

The present disclosure relates to the detection technology for chips in recording devices and, in particular, to a short-circuit self-detection technology of chips.

TECHNICAL BACKGROUND

Recording devices such as printers, copying machines, and facsimile machines, are used to record information on recording media such as paper by means of recording materials such as ink. A recording device comprises a body, and an ink cartridge mounted detachably in the recording device. To ensure that the recording device is able to detect fitness of the ink cartridge within it, the ink cartridge is usually provided with a chip mounted detachably on the ink cartridge. The chip comprises a storage unit, for storing related information about the ink cartridge. When the ink cartridge is arranged on the recording device, the chip of the ink cartridge is electrically connected to the recording device, and exchanges data with the body of the recording device. Specifically, the chip of the ink cartridge is electrically connected to the body of the recording device through terminals, each of the terminals being connected to the storage unit of the chip.

Since the chip comprises at least two terminals electrically connected to the recording device, and there is a potential difference between these terminals while the chip is being used, there might be liquid or dust falling between the two terminals having a potential difference therebetween, for example, between a power supply terminal and a ground terminal, thereby leading to a short circuit and causing damage to the storage unit.

In addition, besides the storage unit, the ink cartridge is also provided with other devices such as a high-voltage circuit with a voltage higher than the driving voltage of the storage unit, a piezoelectric sensor or an induction coil, a resistor, etc. In this case, short circuits will probably occur between terminals of one of the devices and terminals of another device, thus potentially damaging the ink cartridge or the recording device.

Therefore, in order to prevent the ink cartridge or the recording device from being damaged, it may be necessary to detect occurrence of the above-said short circuit in advance.

According to an existing technology of detecting short circuit of chips, the recording device is provided with a short-circuit detection circuit, which judges presence of a short circuit between terminals of the chip by detecting a voltage change on a device-side terminal. However, said detection is performed after the ink cartridge has finished the installation detection on the recording device, at which time, the short circuit is detected, but the storage unit might have been damaged, thus rendering the ink cartridge unusable. Moreover, the above short-circuit detection circuit is provided on the recording device, and therefore, for those recording devices that have already been in the market and are not provided with a short-circuit detection circuit, there will still be difficulties in detecting the short circuit timely, thereby damaging the ink cartridge or the recording device.

According to another existing technology of detecting short circuit of chips, the chip is provided with a battery and a short-circuit detection circuit. The battery supplies power to the short-circuit detection circuit so that short circuit detection of the chip can be performed. After the ink cartridge is arranged in the recording device, the chip is electrically connected to the recording device. Presence of a short circuit between terminals is thus judged by detecting a voltage change on a short-circuit detection terminal of the chip, or by detecting a signal change between the short-circuit detection terminal and a terminal to be detected of the chip. However, according to this existing technology, the short circuit detection can only be performed by providing the chip with a battery, which will increase the manufacturing cost of the chips, and will give rise to the problem that the short circuit detection cannot be performed when the battery runs out after a long-term use.

SUMMARY OF THE INVENTION

One of the objectives of the present disclosure is to provide a low-cost and durable ink cartridge, ink cartridge chip, and short-circuit detection method of chip capable of preventing electric elements of the ink cartridge from being damaged due to short circuits of connecting terminals.

In order to solve the above technical problem, the present disclosure provides an ink cartridge chip comprising a circuit board, which is provided with a plurality of connecting terminals in contact connection with device-side terminals when the ink cartridge chip is mounted to the recording device. The ink cartridge chip further comprises: a short-circuit detection terminal which is entirely or partially disposed between a connecting terminal to be detected and one or more connecting terminals other than the connecting terminal to be detected; a short-circuit detection and processing unit which is connected to a voltage division and power supply unit and one or more than one connecting terminals other than the connecting terminal to be detected. The voltage division and power supply unit is connected to the short-circuit detection and processing unit and the connecting terminal to be detected, for dividing a voltage from the voltage applied on the connecting terminal to be detected, and transmitting the obtained low voltage to the short-circuit detection and processing unit.

Further, the short-circuit detection and processing unit judges presence of a short circuit between the connecting terminals of the ink cartridge chip based on the potential difference of the short-circuit detection terminal and the connecting terminal to be detected, or based on the potential difference of at least two short-circuit detection terminals, and executes short-circuit abnormality processing if a short circuit is determined.

Besides, the short-circuit detection and processing unit is further used to judge whether the potential difference between the short-circuit detection terminal and the connecting terminal to be detected is less than a predetermined value, or whether the potential of the short-circuit detection terminal and the potential of the connecting terminal to be detected are equal to each other, or, judge whether the potential difference between the at least two short-circuit detection terminals is less than a predetermined value, or whether the potentials of the at least two short-circuit detection terminals are equal.

Further, the short-circuit detection and processing unit is electrically connected to more than one of the connecting terminals other than the connecting terminal to be detected. When a short circuit is determined, the short-circuit detection and processing unit cuts off an electric connection between at least two of the more than one connecting terminals other than the connecting terminal to be detected, or connects at least two of the more than one connecting terminals other than the connecting terminal to be detected to the ground.

Further, the more than one connecting terminals other than the connecting terminal to be detected include two installation detection connecting terminals of the ink cartridge chip. The short-circuit detection and processing unit is disposed in series connection between the two installation detection connecting terminals, and is further used to cut off the electric connection between the two installation detection connecting terminals, or to connect the two installation detection connecting terminals to the ground when a short circuit is determined.

Besides, the short-circuit detection and processing unit may further be connected to a low-voltage electric element of the ink cartridge chip. The short-circuit detection and processing unit may further be used to cut off an electric connection between the low-voltage electric element and one or any of the more than one connecting terminals other than the connecting terminal to be detected when a short circuit is determined.

In addition, the short-circuit detection and processing unit may further comprise a detection unit and a controllable switch. The controllable switch comprises a first field effect transistor, and the detection unit comprises a second field effect transistor. The first field effect transistor is connected, at an input end and an output end thereof, to two connecting terminals of the ink cartridge chip other than the connecting terminal to be detected respectively, or to one connecting terminal of the ink cartridge chip other than the connecting terminal to be detected and the low-voltage electric element respectively, or, is connected, at the input end thereof, to two connecting terminals of the ink cartridge chip other than the connecting terminal to be detected, or to one connecting terminal of the ink cartridge chip other than the connecting terminal to be detected and the low-voltage electric element and meanwhile to the ground at the output end thereof. A control end of the first field effect transistor is connected to the ground through a resistance-capacitance circuit. The second field effect transistor is connected to the short-circuit detection terminal at a control end thereof, and to the connecting terminal to be detected at an input end thereof. An output end of the second field effect transistor is connected to the control end of the first field effect transistor and to the ground through the resistance-capacitance circuit.

Besides, the voltage division and power supply unit may further comprise a parallel circuit formed by a third resistor and a second capacitor. The parallel circuit is connected to the ground at one end thereof, and to a second resistor and the short-circuit detection terminal respectively at the other end thereof. The second resistor is connected to the connecting terminal to be detected.

Further, the ink cartridge chip may comprise two or more than two short-circuit detection terminals. The voltage division and power supply unit is connected to each of the short-circuit detection terminals and the connecting terminal to be detected respectively, and supplies each of the low voltages obtained through division of the voltage applied on the connecting terminal to be detected step-by-step to each of the short-circuit detection terminals respectively by means of a voltage division circuit.

Besides, the short-circuit detection terminals may further include a first short-circuit detection terminal and a second short-circuit detection terminal, and the voltage division and power supply unit further includes a first voltage division circuit and a second voltage division circuit. The first voltage division circuit divides a voltage from the connecting terminal to be detected, and supplies an obtained first low voltage to the first short-circuit detection terminal, and the second voltage division circuit divides the voltage from the connecting terminal to be detected, and supplies an obtained second low voltage to the second short-circuit detection terminal.

In addition, the short-circuit detection and processing unit may further comprise a detection unit and a controllable switch. The controllable switch comprises a first field effect transistor, which is connected, at an input end and an output end thereof, to two connecting terminals of the ink cartridge chip other than the connecting terminal to be detected, or to a connecting terminal other than the connecting terminal to be detected and the low-voltage electric element of the ink cartridge chip, or, is connected, at the input end thereof, to two connecting terminals of the ink cartridge chip other than the connecting terminal to be detected, or to one connecting terminal of the ink cartridge chip other than the connecting terminal to be detected and the low-voltage electric element, and meanwhile to the ground at the output end thereof. A control end of the first field effect transistor is connected to the ground through a resistance-capacitance circuit. The detection unit further comprises a second field effect transistor which is connected to the first short-circuit detection terminal at a control end thereof, and to the second short-circuit detection terminal at an input end thereof. An output end of the second field effect transistor is connected to the control end of the first field effect transistor and to the ground through the resistance-capacitance circuit.

Further, the first voltage division circuit comprises a first resistance-capacitance circuit and a resistor. The first resistance-capacitance circuit is connected to the ground at one end thereof, and to said resistor (R12) of the first voltage division circuit and the first short-circuit detection terminal respectively at the other end thereof. The second voltage division circuit comprises a second resistance-capacitance circuit and a resistor. The second resistance-capacitance circuit is connected to the ground at one end thereof, and to said resistors (R25, R22) of the second voltage division circuit and the second short-circuit detection terminal respectively at the other end thereof. Said resistor (R12) of the first voltage division circuit and said resistors (R25, R22) of the second voltage division circuit are connected respectively to the connecting terminal to be detected.

Further, the connecting terminal to be detected is a high-voltage connecting terminal, and others of the one or more connecting terminals are low-voltage connecting terminals.

Further, the short-circuit detection terminal is arranged in a line between the connecting terminal to be detected and other connecting terminals, or is arranged in annular around the connecting terminal to be detected. Further, the short-circuit abnormality processing comprises steps of: cutting off a connection between at least one of the at least two connecting terminals and the low-voltage electric element of the ink cartridge chip; and/or cutting off a connection between two or more of the at least two connecting terminals; and/or sending a signal indicating abnormality of the ink cartridge chip to the recording device.

According to another aspect of the present disclosure, an ink cartridge is provided. The ink cartridge comprises the ink cartridge chip according to the aforesaid technical solutions.

According to another aspect of the present disclosure, a short-circuit detection method of chip in an ink cartridge chip is provided. The method comprises steps of dividing a voltage applied on a connecting terminal to be detected to obtain one or more low voltages, and transmitting the low voltages to a short-circuit detection and processing unit.

Further, presence of a short circuit between the short-circuit detection terminal and the connecting terminal to be detected is judged by detecting the potential difference of the short-circuit detection terminal and the connecting terminal to be detected, or by detecting the potential difference of two or at least two of the short-circuit detection terminals. If a short circuit is determined, the short-circuit abnormality processing will be executed.

Further, if a short circuit in the ink cartridge chip is determined, the short-circuit abnormality processing as follows will be executed. A connection between at least one of the at least two connecting terminals and the low-voltage electric element of the ink cartridge chip is cut off, and/or a connection between two or more of the at least two connecting terminals is cut off, and/or a signal indicating abnormality of the ink cartridge chip is sent to the recording device.

Compared with existing technologies, one or more of the embodiments of the present disclosure has the following advantages. According to the present disclosure, presence of a short circuit can be detected automatically by the ink cartridge chip side once the ink cartridge is mounted into the recording device, which reduces the possibility that the storage unit in the ink cartridge has already been damaged when the short circuit is detected by the recording device. Besides, for recording devices that are not provided with a short-circuit detection circuit, the safety factor of using the ink cartridge is also increased. Moreover, compared with supplying power by the battery to the short-circuit detection circuit according to the existing technologies, to divide a voltage by the voltage division and power supply unit and then transmit the obtained low voltage to the short-circuit detection and processing unit is able to effectively reduce the cost, solve the problem that the short-circuit detection cannot be performed after the battery runs out, and satisfy long-term use of the chip.

Other advantages, objectives, and features of the present disclosure will be further explained in the following description, and will partly become self-evident therefrom, or be understood through the implementation of the present disclosure. The objectives and advantages of the present disclosure will be achieved through the structures specifically pointed out in the description, claims, and the accompanying drawings.

BRIEF DESCRIPTION OF THE DRAWINGS

The accompanying drawings are provided for further understanding the present disclosure, and constitute a part of the description, and are used to illustrate the present disclosure together with the embodiments of the present disclosure, rather than restrict the present disclosure.

FIG. 1b schematically shows arrangement structure of device-side terminals of an ink-jet printer applicable to the ink cartridge as shown in FIG. 1a;

FIG. 2b schematically shows an enlarged view of structure of the detection terminal in FIG. 2a;

DETAILED DESCRIPTION OF THE EMBODIMENTS

Figure 1A:
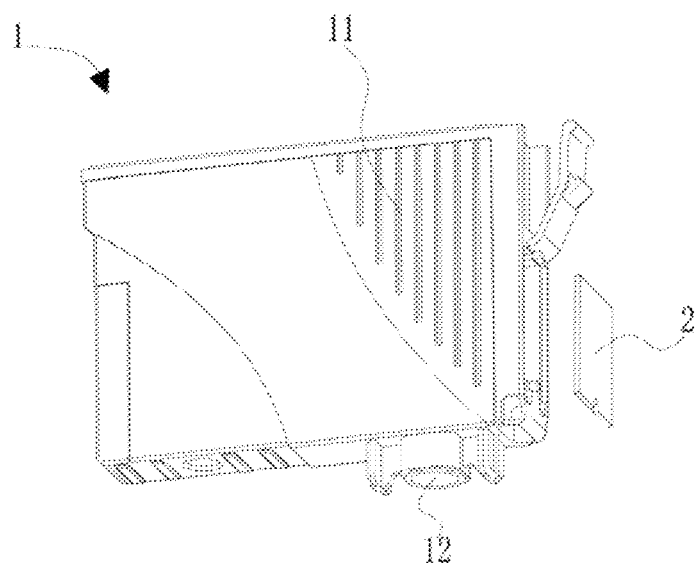
FIG. 1a schematically shows structure of an ink cartridge applicable to a chip provided in embodiment 1 of the present disclosure.

The present disclosure will be explained in detail with reference to the embodiments and the accompanying drawings, so as to fully understand how to solve the technical problem and achieve the technical effects by the technical means according to the present disclosure, and thus implement the same. It should be noted that as long as there is no structural conflict, any of the embodiments and any of the technical features thereof may be combined with one another, and the technical solutions obtained therefrom all fall within the scope of the present disclosure.

The ink cartridge chip according to the present disclosure comprises a circuit board, which is provided with a plurality of connecting terminals in contact connection with device-side terminals when the ink cartridge chip is mounted to the recording device. The ink cartridge chip further comprises a short-circuit detection terminal, a short-circuit detection and processing unit, and a voltage division and power supply unit (303, 403).

The short-circuit detection terminal is entirely or partially disposed between a connecting terminal to be detected and one or more connecting terminals other than the connecting terminal to be detected. The short-circuit detection and processing unit is connected to the voltage division and power supply unit and one or more of the connecting terminals other than the connecting terminal to be detected. The voltage division and power supply unit is connected to the short-circuit detection and processing unit, for dividing a voltage from the connecting terminal to be detected and transmitting an obtained low voltage to the short-circuit detection and processing unit.

The supply of power by the voltage division and power supply unit to the short-circuit detection and processing unit is able to reduce the cost of the short-circuit detection of chip and ensure a long-term use of the chip. The short-circuit detection and processing unit of the chip executes the short-circuit detection and the short-circuit abnormality processing in the following specific ways:

The short-circuit detection and processing unit judges presence of a short circuit between the connecting terminals of the ink cartridge chip based on the potential difference of the short-circuit detection terminal and the connecting terminal to be detected, or based on the potential difference of at least two of the short-circuit detection terminals, and executes the short-circuit abnormality processing if a short circuit is determined. More specifically, the short-circuit detection and processing unit judges presence of a short circuit between the connecting terminals of the ink cartridge chip based on a potential difference between at least two of the short-circuit detection terminals, or based on a potential difference between the short-circuit detection terminal and the connecting terminal to be detected.

One skilled person in the art should understand that, in order to simplify the description and make the technical solutions be clearly displayed, the following embodiments will take an ink-jet printer and an ink cartridge thereof only as an example. The technical solutions in the following embodiments also apply to other types of containers for printing materials and the corresponding recording devices. Similarly, the ink cartridge can also be other types of containers for other printing materials, such as a toner container.

Embodiment 1

Figure 1B:
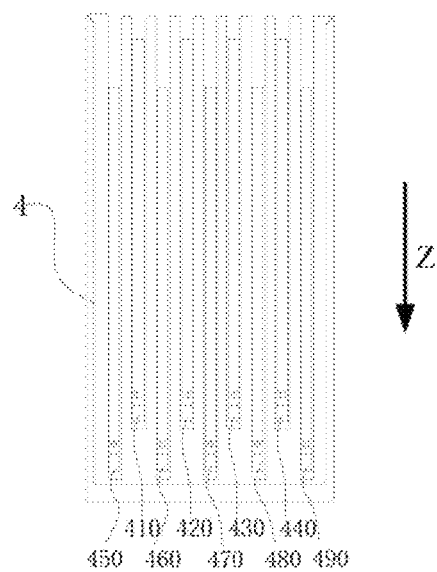
Figure 1C:
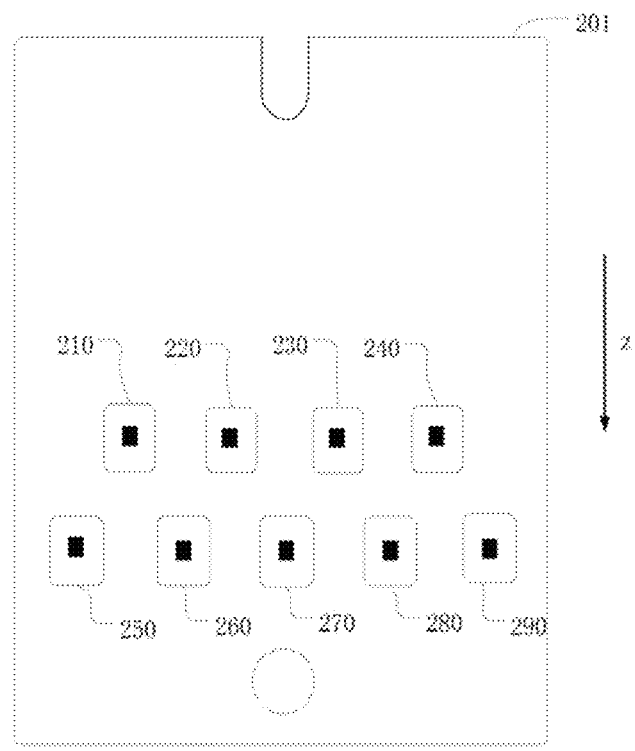
FIG. 1c schematically shows a front view of structure of the chip provided in embodiment 1 of the present disclosure.
Figure 1D:
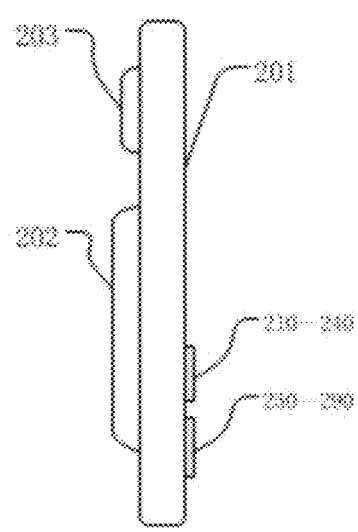
FIG. 1d schematically shows a side view of structure of the chip provided in embodiment 1 of the present disclosure.
Figure 1E:
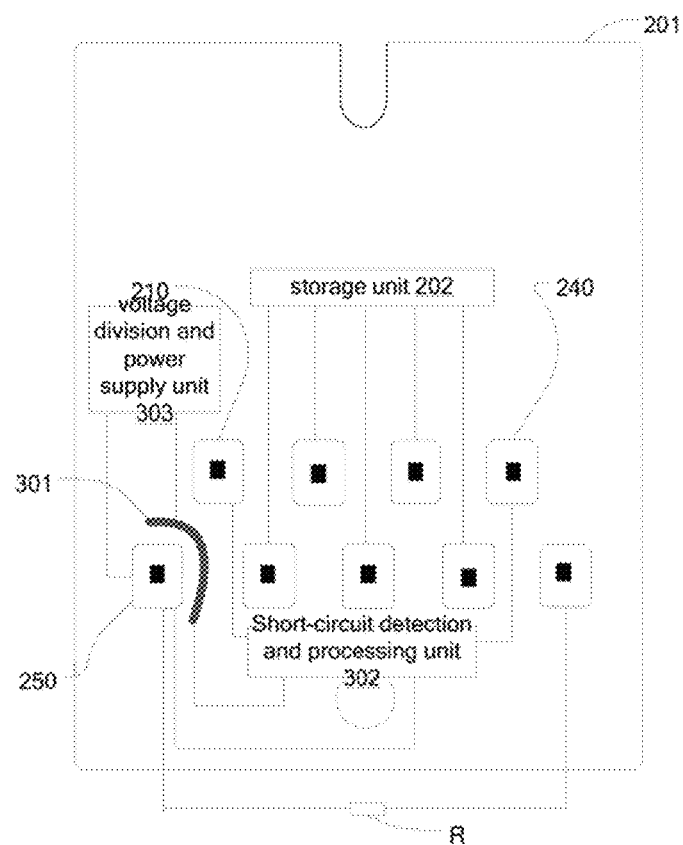
FIG. 1e schematically shows structure of a circuit of the chip provided in embodiment 1 of the present disclosure.
Figure 1F:
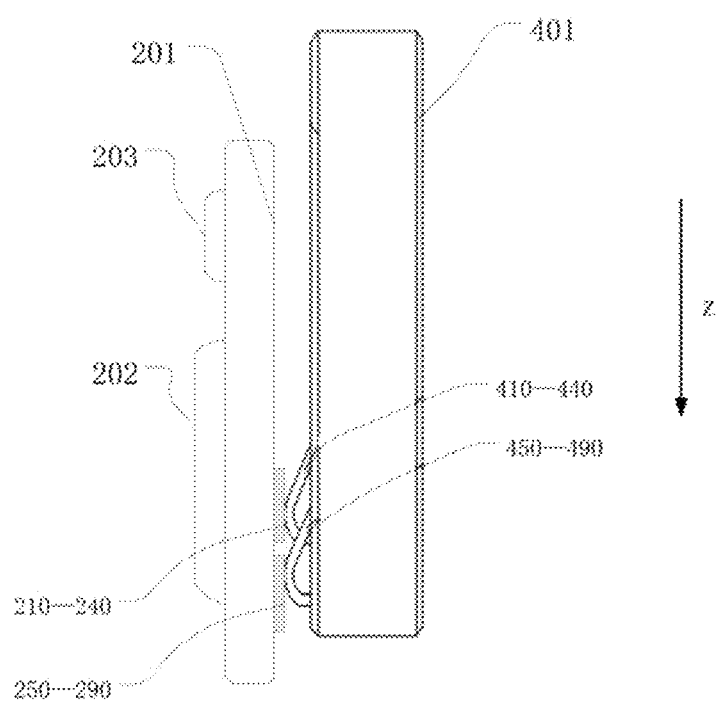
FIG. 1f schematically shows structure of mounting the ink cartridge applicable to embodiment 1 of the present disclosure to a corresponding printer.

FIG. 1a schematically shows structure of an ink cartridge applicable to a chip provided in the present embodiment. FIG. 1b schematically shows arrangement structure of device-side terminals of an ink-jet printer applicable to the ink cartridge as shown in FIG. 1a. FIG. 1c schematically shows a front view of structure of the chip provided in the present embodiment. FIG. 1d schematically shows a side view of structure of the chip provided in the present embodiment. FIG. 1e schematically shows structure of a circuit of the chip provided in the present embodiment. FIG. 1f schematically shows structure of mounting the ink cartridge applicable to the present embodiment to a corresponding printer.

As shown in FIG. 1a, the ink cartridge 1 comprises: a body 11, for storing ink used for printing; an ink supply part 12, which is formed on a bottom wall of the body 11, and is connected to an ink supply tube when the ink cartridge 1 is mounted into the ink-jet printer so as to deliver ink in the body 11 to a printing head; an ink cartridge chip 2, which is arranged detachably on an outer wall of the body 11, and is opposite to and electrically connected to a contact mechanism 4 of the printer as shown in FIG. 1b when the ink cartridge 1 is mounted into the ink-jet printer.

As shown in FIG. 1b, the contact mechanism 4 is provided with a plurality of device-side terminals, and in the present embodiment, there are nine device-side terminals. The nine device-side terminals 410-490 in the contact mechanism 4 are arranged in two rows at given intervals along and perpendicular to a direction Z of inserting the ink cartridge into the printer.

As shown in FIG. 1c, the chip 2 comprises a circuit board 201, which is provided with a plurality of connecting terminals 210-290 in contact connection with device-side terminals 410-490 of the body of the recording device. When the circuit board 201 is mounted to the body 11 of the ink cartridge, the connecting terminals 210-290 are exposed at an outer surface of the circuit board 201. This outer surface is referred to as a front side of the circuit board, and the surface opposite to the front side is referred to as a back side of the circuit board. Nine connecting terminals each are usually configured to have a rectangular shape, and are preferably arranged in two rows at given intervals along and perpendicular to the direction Z of inserting the ink cartridge into the printer. The connecting terminals 210-240 in the upper row and the connecting terminals 250-290 in the lower row are arranged in a stagger manner.

As shown in FIG. 1d, the chip 2 comprises the circuit board 201, a storage unit 202, a resistor element 203, and the connecting terminals 210-290. The chip 2 comprises two electrical elements, which respectively are, a first electrical element arranged on the circuit board 201, namely the storage unit 202, and a second electrical element arranged on the circuit board 201, namely the resistor element 203. In the present embodiment, the second electrical element can also be a piezoelectric sensor arranged on the ink cartridge. The storage unit 202 can be a storage medium such as EEPROM, RAM+battery, FLASH, etc, mainly for storing related information about the ink cartridge such as ink volume, type of the ink cartridge and so on. When working, the resistor element 203 is applied a high driving voltage of such as 42V, which is much higher than a driving voltage of 3.6V of the storage unit 202. The chip 2 comprises nine connecting terminals, which respectively are, low-voltage connecting terminals 210-240 and 260-280 connected to low-voltage electric elements, and high-voltage connecting terminals 250 and 290 connected to high-voltage electric elements. Among the low-voltage connecting terminals 210-240 and 260-280, the low-voltage connecting terminals 210 and 240 are installation detection terminals, and others are connected respectively to the storage unit 202. The high-voltage connecting terminals 250 and 290 are connected respectively to the resistor element 203. The storage unit 202 and the resistor element 203 are arranged on the back side of the circuit board 201. The nine connecting terminals 210-290 form a terminal group which is arranged on the front side of the circuit board 201.

As shown in FIG. 1f, when the ink cartridge 1 is inserted into the ink-jet printer, the chip 2 faces the contact mechanism 4 of the printer as shown in FIG. 1b, and the nine connecting terminals 210-290 of the chip 2 come into contact with and are electrically connected to the nine device-side terminals 410-490 of the contact mechanism 4 of the printer in a one-to-one correspondence manner, thereby transmitting signals between the electrical elements and the ink-jet printer.

In order to detect short circuit of chip efficiently and prevent the chip from being damaged, besides the connecting terminals, the circuit board is further provided with a short-circuit detection terminal, a short-circuit detection and processing unit, and a voltage division and power supply unit.

In addition, there can be one or more short-circuit detection terminals, each of which is entirely or partially disposed between a connecting terminal to be detected and other connecting terminals in the circuit board. The voltage division and power supply unit is used to divide a voltage applied on the connecting terminal to be detected so as to obtain one or more low voltages, and transmit the low voltage to the short-circuit detection and processing unit so as to supply power to the short-circuit detection and processing unit. The short-circuit detection and processing unit is able to judge presence of a short circuit between the short-circuit detection terminal and the connecting terminal to be detected based on the potential difference of the short-circuit detection terminal and the connecting terminal to be detected, or based on the potential difference of more than one of the short-circuit detection terminals, and execute short-circuit abnormality processing if a short circuit is determined, so as to prevent the ink cartridge chip from being damaged. The short-circuit abnormality processing, for example, may comprise the steps of: cutting off a connection between the connecting terminal and the storage unit; and/or cutting off a connection between at least two connecting terminals; and/or sending a signal indicating abnormality of the ink cartridge chip to the recording device, so that the printer can produce an error report such as "installation abnormality of ink cartridge", "short circuit of ink cartridge", etc, thereby stopping the printing. Thus, the user can check or change the ink cartridge.

Preferably, the connecting terminal to be detected is a high-voltage connecting terminal. That is, the short-circuit detection terminal is arranged between the low-voltage connecting terminal and the high-voltage connecting terminal. In this way, short circuit between the high-voltage connecting terminal and the low-voltage connecting terminal can be particularly detected, thereby preventing the low-voltage electric element connected to the low-voltage connecting terminal from being damaged due to a high voltage.

In addition, the short-circuit detection and processing unit judges presence of a short circuit between the connecting terminal to be detected of the ink cartridge chip and other connecting terminals based on the potential difference of the short-circuit detection terminal and the connecting terminal to be detected which are both connected to the short-circuit detection and processing unit, or based on the potential difference of a plurality of the short-circuit detection terminals connected to the short-circuit detection and processing unit. More specifically, the judgment by the short-circuit detection and processing unit is based on voltage difference between the short-circuit detection terminal and the connecting terminal to be detected, or based on voltage difference among a plurality of the short-circuit detection terminals (e.g., whether the voltages are equal). For example, if a potential difference between the short-circuit detection terminal and the connecting terminal to be detected or potential differences among a plurality of the short-circuit detection terminals is less than a predetermined value, or the potentials are the same, it is determined that a short circuit exists between the connecting terminals of the ink cartridge chip. Otherwise, short circuit does not exist. If the short circuit is determined, the short-circuit abnormality processing will be executed.

In the present embodiment, as shown in FIG. 1e, there is one short-circuit detection terminal, namely a short-circuit detection terminal 301. The voltage division and power supply unit 303 is connected respectively to the short-circuit detection terminal 301 and the connecting terminal 250 to be detected, for dividing the voltage of 42V applied on the connecting terminal 250 to be detected so as to obtain a low voltage ranging between 0V-38V, and transmitting the low voltage to the corresponding short-circuit detection terminal 301, thereby supplying power to the short-circuit detection terminal 301 and a short-circuit detection and processing unit 302. The short-circuit detection and processing unit 302 is connected respectively to the short-circuit detection terminal 301 and the connecting terminal 250 to be detected, and judges presence of a short circuit exists between the short-circuit detection terminal 301 and the connecting terminal 250 to be detected based on the potential difference of the short-circuit detection terminal 301 and the connecting terminal 250 to be detected, and executes the short-circuit abnormality processing if a short circuit is determined.

Specifically, as shown in FIG. 1e, the short-circuit detection terminal 301 is entirely or partially disposed between the connecting terminal 250 to be detected and the connecting terminal 210 or 260, and is arranged near the connecting terminal 250 at a preset distance. Being entirely or partially disposed between the connecting terminal to be detected and other connecting terminals herein means that the entirety or part of the short-circuit detection terminal 301 is disposed in a straight line or an arc connecting the connecting terminal 250 to be detected and the connecting terminal 210 or 260.

The voltage division and power supply unit 303 is connected respectively to the short-circuit detection terminal 301 and the connecting terminal 250 to be detected, and divides the voltage through a voltage division circuit formed by a resistor and other elements. The voltage division and power supply unit 303 divides the voltage of 42V applied on the connecting terminal 250 to be detected so as to obtain a low voltage ranging within 0V-38V, and transmits the low voltage to the short-circuit detection terminal 301, thereby supplying power to the short-circuit detection terminal 301 and the short-circuit detection and processing unit 302.

The short-circuit detection and processing unit 302 is connected to the short-circuit detection terminal 301 and the connecting terminal 250 to be detected, and judges presence of a short circuit based on the potential difference of the short-circuit detection terminal 301 and the connecting terminal 250 to be detected. The short-circuit detection and processing unit 302 is connected to the connecting terminals 210 and 240, and executes the short-circuit abnormality processing with respect to the connecting terminals 210 and 240 if a short circuit is determined. The short-circuit detection and processing unit can perform the short-circuit detection by using a field-effect transistor or a triode, and execute the short-circuit abnormality processing by using a field-effect transistor, a controllable switch, or a self-recovery fuse wire.

The short-circuit abnormality processing may comprise cutting off a circuit between the two installation detection connecting terminals 210 and 240 of the chip 2, or disconnecting the connecting terminal of the chip 2 from the storage unit. More specifically, when a short circuit is determined, the short-circuit detection and processing unit disconnects the storage unit from the connecting terminal to be detected or from any of the one or more connecting terminals other than the connecting terminal to be detected, or disconnects the connecting terminal from the storage unit.

Since the connecting terminals 210 and 240 are installation detection connecting terminals, after the electric connection therebetween is cut off, the ink cartridge, when performing the installation detection, will produce an abnormal response indicating an error of the printer. The short-circuit abnormality processing may also be executed by sending a "short circuit signal" to the printer, for warning the printer to perform related processing. The short circuit signal may be an "error report" or a "message about the short circuit" recognizable to the printer.

Inspired by the above technical inspiration, one skilled person in the art should understand that, the short-circuit detection and processing unit 302 can be electrically connected to more than one of the connecting terminals other than the connecting terminal to be detected, and that when a short circuit is determined, the short-circuit abnormality processing can be executed by cutting off the electrical connection between at least two of the more than one connecting terminals other than the connecting terminal to be detected, thereby rendering it impossible for the cartridge chip to normally respond to the recording device. The disconnected two connecting terminals herein are not limited to the two installation detection connecting terminals.

Figure 2A:
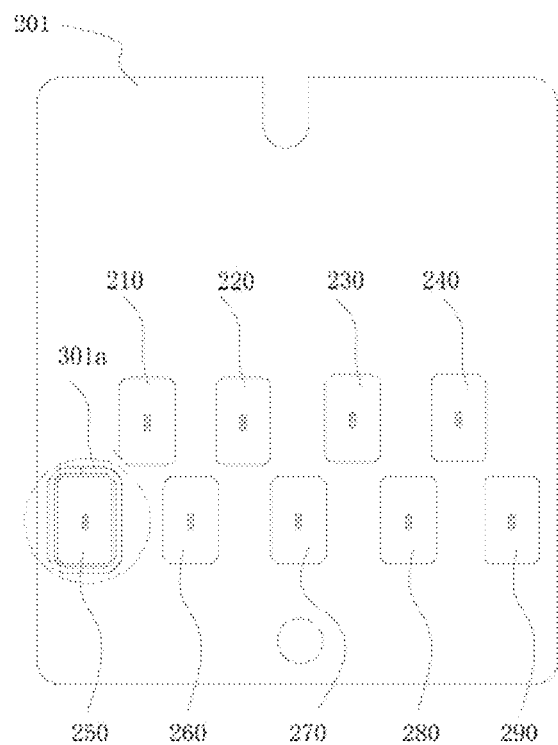
FIG. 2a schematically shows structure of an ink cartridge chip according to embodiment 1 of the present disclosure.
Figure 2B:
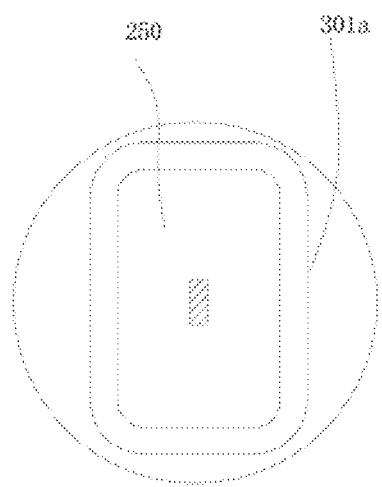

One skilled person in the art should understand that the short-circuit detection terminal can be structured to be in any shapes. The above-said short-circuit detection terminal may be arranged near the connecting terminal to be detected in any directions. When being arranged in a certain direction, the short-circuit detection terminal may be used for detecting presence of a short circuit between itself and the connecting terminal in said direction. In a preferred technical solution, to ensure that the short-circuit detection terminal is able to detect possible occurrence of a short circuit between a certain connecting terminal and other connectional terminals in every direction, the short-circuit detection terminal can be structured to be an annular terminal around said certain connecting terminal. FIG. 2a schematically shows structure of the ink cartridge chip according to the present embodiment, and FIG. 2b schematically shows an enlarged view of structure of the short-circuit detection terminal in FIG. 2a. As shown in FIGS. 2a and 2b, the short-circuit detection terminal 301a is in an annular shape, and is arranged around the connecting terminal 250 at a preset distance from outside. To arrange the short-circuit detection terminal 301a around the connecting terminal 250 is a preferred example for detecting presence of a short circuit in each direction of said certain connecting terminal.

One skilled person in the art should understand that, in the present embodiment, the short-circuit detection terminal is not limited to one, and it can be a pair of high-voltage detection connecting terminals, or be arranged accordingly in one or more pairs around any one or more of the connecting terminals, detecting presence of a short circuit between each of the connecting terminals and other terminals based on the potential difference of a corresponding pair of short-circuit detection terminals. In addition, the short-circuit detection terminals can also be linear terminals arranged along a direction of a straight or arc line connecting the connecting terminal to be detected and other connecting terminals. The linear terminals can be arc terminals as shown in FIG. 1c or annular terminals as shown in FIG. 2a, and can be arranged in other regular or irregular shapes. The method and short-circuit detection method of chip provided in the present embodiment is not limited to the aforesaid chips.

The present embodiment further provides an ink cartridge which includes the ink cartridge chip provided in any of the embodiments of the present disclosure.

The present embodiment further provides a recording device which comprises a body and the aforesaid ink cartridge. The body of the recording device is provided with device-side terminals which are in contact connection to the connecting terminals in a one-to-one correspondence manner when the ink cartridge is mounted to the recording device.

Figure 3A:
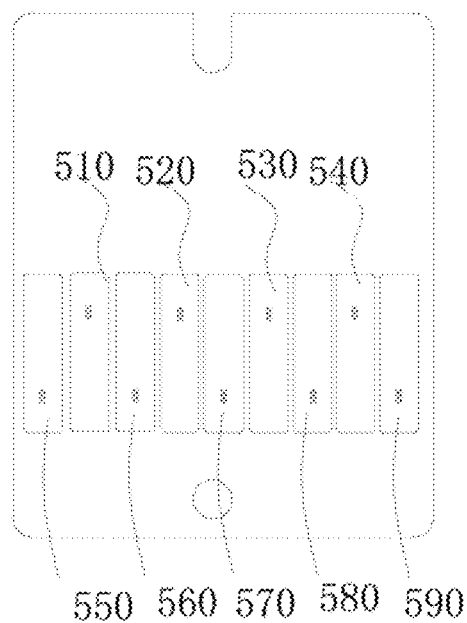
FIG. 3a schematically shows connecting terminals of an ink cartridge chip according to embodiment 1 of the present disclosure.
Figure 3B:
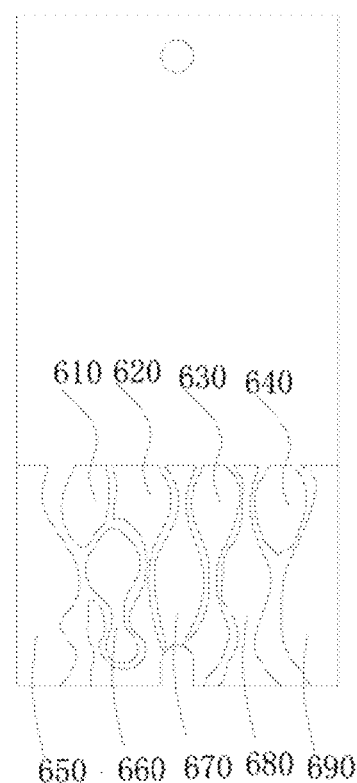
FIG. 3b schematically shows connecting terminals of another ink cartridge chip according to embodiment 1 of the present disclosure.

One skilled person in the art should understand that, on the premise that the chip is in good contact with the printer, the connecting terminals on the chip can be structured in other shapes or be arranged in other forms. As shown in FIG. 3a, the connecting terminals 510-590 are arranged in one line, and as shown in FIG. 3b, the connecting terminals 610-690 are arranged in irregular forms. The detection terminal group is not shown in FIGS. 3a and 3b.

Embodiment 2

Figure 4A:
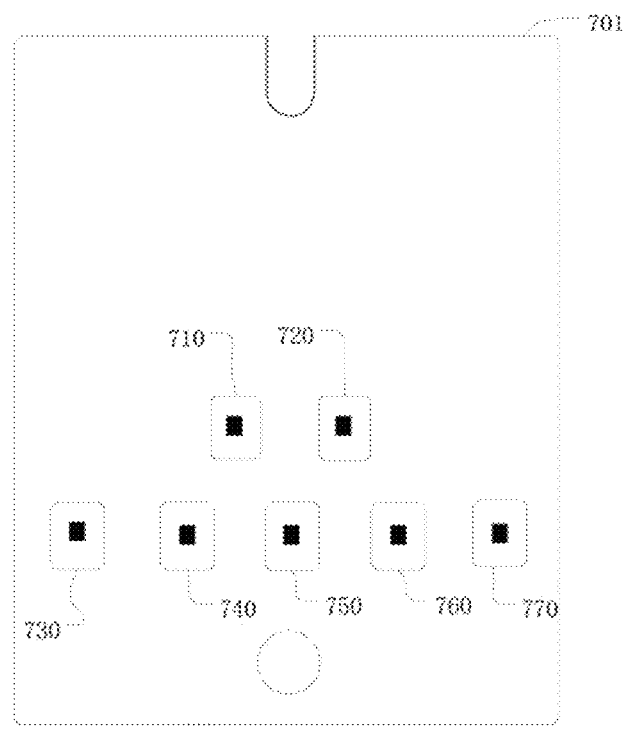
FIG. 4a schematically shows a front view of structure of a chip according to embodiment 2 of the present disclosure.
Figure 4B:
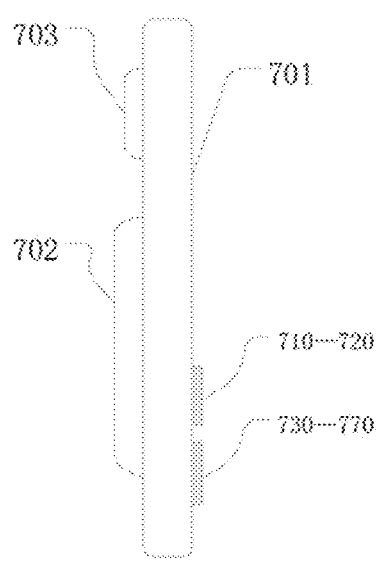
FIG. 4b schematically shows a side view of structure of the chip according to embodiment 2 of the present disclosure.

FIG. 4a schematically shows a front view of structure of a chip according to the present embodiment; FIG. 4b schematically shows a side view of structure of the chip according to the present embodiment; and FIG. 4c schematically shows structure of a circuit of the chip according to the present embodiment.

The present embodiment provides a chip. As shown in FIG. 4b, the chip comprises a circuit board 701, a storage unit 702, and a second electrical element 703. The circuit board 701 is provided thereon with two rows of connecting terminals, preferably. The storage unit 702 is used for storing information about the ink cartridge. The second electrical element 703 may also be provided on the ink cartridge on which the chip is arranged. The second electrical element 703 may be a piezoelectric sensor, or a resistor element.

As shown in FIG. 4a, the connecting terminals on the circuit board 701 of the chip are arranged in two lines, and respectively are connecting terminals 710-720 in the upper row and connecting terminals 730-770 in the lower row, the connecting terminals in the upper row and the connecting terminals in the lower row being arranged in a stagger manner. The connecting terminals 710, 720, and 740-760 are connected to the storage unit 702 respectively, and are referred to as low-voltage connecting terminals. The connecting terminals 730 and 770 are respectively connected to the second electrical element 703, and are referred to as high-voltage connecting terminals.

Figure 4C:
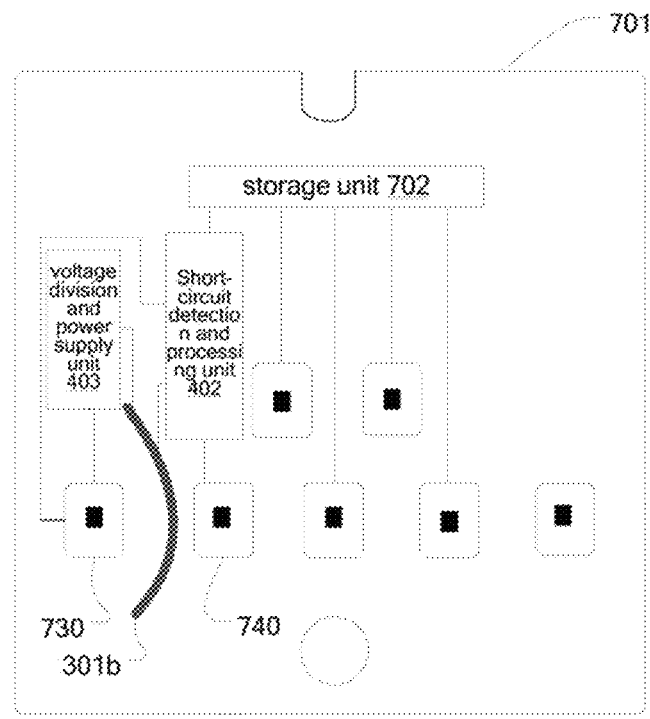
FIG. 4c schematically shows structure of a circuit of the chip according to embodiment 2 of the present disclosure.

As shown in FIG. 4c, a short-circuit detection terminal 301b is arranged between a connecting terminal 730 to be detected and one or more other connecting terminals (e.g., the connecting terminal 740).

A voltage division and power supply unit 403 is electrically connected to the short-circuit detection terminal 301b and the connecting terminal 730 respectively, and divides voltage and supplies power through a voltage division circuit formed by a resistor and other elements.

A short-circuit detection and processing unit 402 is electrically connected to the short-circuit detection terminal 301b and the connecting terminal 730 to be detected, so as to judge presence of a short circuit between the connecting terminal 730 and other connecting terminals (herein taking the connecting terminal 740 as an example) based on voltage difference on the short-circuit detection terminal 301b and the connecting terminal 730 to be detected. The connecting terminal 740 is connected in series to the storage unit 702 through the short-circuit detection and processing unit 402. When the short circuit is determined, the short-circuit detection and processing unit 402 cuts off the electric connection between the connecting terminal 740 and the storage unit 702 so as to execute short-circuit abnormality processing.

The short-circuit detection and processing unit 402 further judges presence of short circuits among the connecting terminals of the ink cartridge chip by a field-effect transistor or a triode. Besides, the short-circuit detection and processing unit 402 may execute the short-circuit abnormality processing by using a field-effect transistor, a controllable switch, or a self-recovery fuse wire.

In the present embodiment, the short-circuit detection and processing unit is preferably connected between the low-voltage connecting terminal and the storage unit. In this manner, when a short circuit is determined, a signal channel between the connecting terminal and the storage unit can be cut off, thereby preventing the storage unit from being applied a high-voltage signal, and thus protecting the storage unit and the ink cartridge.

In the present embodiment, the voltage division and power supply unit 403 divides a voltage of 36V applied on the connecting terminal 730, obtaining a low voltage ranging within 0V-32V, and then transmits the low voltage to the short-circuit detection terminal 301b so as to supply power to the short-circuit detection terminal 301b and the short-circuit detection and processing unit 402. The short-circuit detection and processing unit 402 judges presence of a short circuit between the short-circuit detection terminal 301b and the connecting terminal 730 based on the potential difference of the short-circuit detection terminal 301b and the connecting terminal 730, and executes the short-circuit abnormality processing if the short circuit is determined. Specifically, the short-circuit abnormality processing may be executed as follows. The connecting terminal 740 is disconnected from the storage unit 702, and the signal channel between the connecting terminal and the storage unit is cut off so that the printer cannot receive a normal response signal and thus produce an error report. The short-circuit abnormality processing may also be sending a "short circuit signal" to the printer so as to warn the printer to execute related processing. The "short circuit signal" may be signals such as an "error report" or a "short circuit message" recognizable to the printer.

One skilled person in the art should understand that, in the present embodiment, the short-circuit detection terminal is not limited to one, and it can be a pair of high-voltage detection connecting terminals, and can be accordingly arranged in one or more pairs around any one or more of the connecting terminals of the chip, for detecting presence of short circuits among other connecting terminals. The short-circuit detection terminals can be arranged in an annular shape or in other regular or irregular shapes. The method and short-circuit detection method of chip provided in the present embodiment is not limited to the aforesaid chip, ink cartridge, and recording device, but is also applicable to other types of chips, image cartridges, and recording devices.

Embodiment 3

Figure 5:
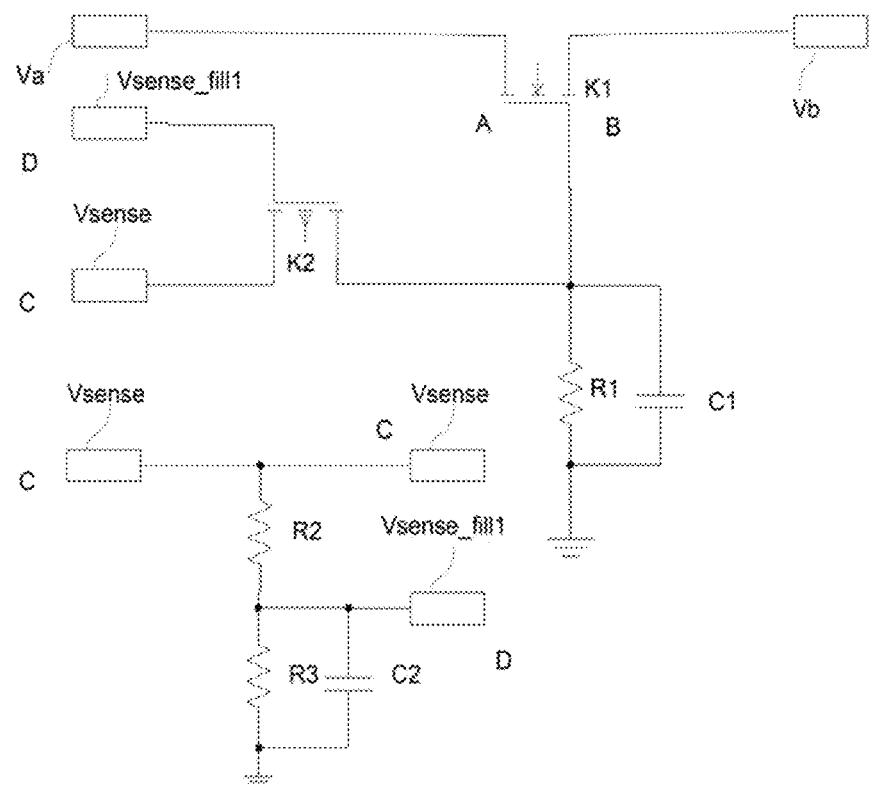
FIG. 5 schematically shows structure of a circuit of a short-circuit detection device of chip according to embodiment 3 of the present disclosure.

FIG. 5 schematically shows structure of circuits of a short-circuit detection device of chip according to the present embodiment. The two circuits respectively show circuit structure of a short-circuit detection and processing unit and circuit structure of a voltage division and power supply unit. One skilled person in the art should understand that said short-circuit detection device of chip can be formed of a hardware circuit.

As shown in FIG. 5, in the circuit, a terminal D is a short-circuit detection terminal (which may corresponds to the terminals 301 and 301b in the preceding embodiments), and a terminal C is a connecting terminal to be detected (which may corresponds to the connecting terminals 250 and 730 to be detected in the preceding embodiments). A and B are respectively other terminals or elements other than the terminals D and C on a chip on which a short-circuit detection and processing unit is provided. For example, A and B may respectively be two connecting terminals (which may correspond to the connecting terminals 210 and 240 in the preceding embodiments) other than the connecting terminal to be detected, or a connecting terminal other than the connecting terminal to be detected and a storage unit on the circuit of the chip (which may correspond to the connecting terminal 740 and storage unit 702 in the preceding embodiments).

The short-circuit detection and processing unit comprises a detection unit and a controllable switch. The controllable switch comprises a first field-effect transistor K1 which is connected to A and B respectively at an input end and an output end. A control end of the first field-effect transistor is connected to the ground through a resistance-capacitance circuit formed by a first resistor R1 and a first capacitor C1. The detection unit comprises a second field-effect transistor K2 which is connected to the short-circuit detection terminal D at a control end thereof, to the connecting terminal C at an input end thereof, and to the control end of the first field-effect transistor K1 and the resistance-capacitance circuit at an output end thereof.

A voltage division and power supply unit comprises a parallel circuit formed by a third resistor R3 and a second capacitor C2. The parallel circuit is connected to the ground at one end thereof, and to a second resistor R2 and the short-circuit detection terminal D respectively at the other end thereof. The second resistor R2 is connected to the connecting terminal C.

In the present embodiment, the first field-effect transistor K1 can be formed of NMOS (namely an N-type field-effect transistor), and the second field-effect transistor K2 can be formed of PMOS (namely a P-type field-effect transistor). As shown in FIG. 5, the voltage division and power supply unit divides a voltage Vsense applied on the connecting terminal C to be detected to obtain a low voltage Vsense_fill1, and supplies the low voltage Vsense_fill1 to the short-circuit detection terminal D, thereby supplying power to the short-circuit detection terminal D and the short-circuit detection and processing unit. In the absence of a short circuit on the chip, the potential of Vsense of the connecting terminal C is higher than the potential of Vsense_fill1 of the short-circuit detection terminal D; the second field-effect transistor K2 is in the conducting state; the short-circuit detection and processing unit does not detect occurrence of a short circuit; the input end and the output end of the first field-effect transistor K1 are electrically connected, i.e., the two installation detection connecting terminals A and B are connected to each other through the first field-effect transistor K1; and the chip works normally.

When a short circuit occurs on the short-circuit detection terminal D, i.e., when the connecting terminal C is shorted with the short-circuit detection terminal D, the potential of Vsense of the connecting terminal C is equal to the potential of Vsense_fill1 of the short-circuit detection terminal D; the second field-effect transistor K2 is in the cut-off state; the short-circuit detection and processing unit detects occurrence of the short circuit; the input end and the output end of the first field-effect transistor K1 are disconnected from each other; and obviously, the connecting terminals A and B are not connected to each other, thereby causing the printer to produce an error report to warn a user to check the ink cartridge.

One skilled person in the art should understand that, in the present embodiment, the field-effect transistors can also be substituted with other switching elements such as triodes, self-recovery fuse wires, relays, or others, as long as the circuit between the connecting terminals can be controlled to be cut off.

One skilled person in the art should understand that, in the present embodiment, the short-circuit detection and processing unit and the voltage division and power supply unit can be integrated into one unit module or into one circuit, and that unit modules or circuits having similar functions are all applicable to the present embodiment.

Embodiment 4

Figure 7:
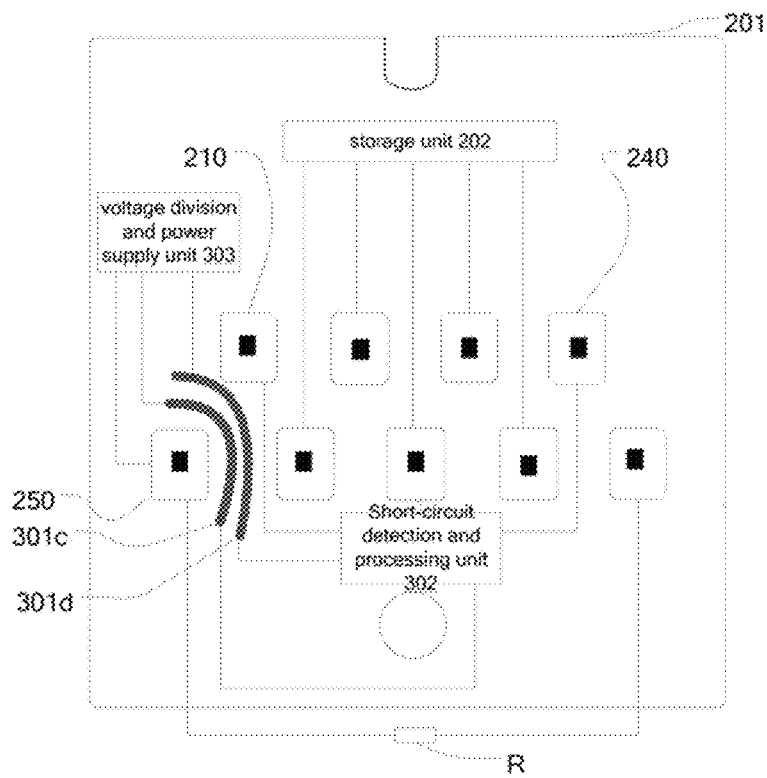
FIG. 7 schematically shows structure of a circuit of applying another short-circuit detection device of chip according to embodiments of the present disclosure to a nine-contact chip according to embodiment 1.

FIG. 7 schematically shows structure of a circuit of applying another short-circuit detection device of chip provided by the present embodiment to the nine-contact chip provided in embodiment 1. For ease of illustration, in the present embodiment, elements being the same or corresponding to those in embodiment 1 will be indicated with same reference signs as in embodiment 1.

As shown in FIG. 7, in the present embodiment, provided are two chip short-circuit detection terminals, which are short-circuit detection terminals 301c and 301d respectively. The terminals 301c and 301d each are entirely or partially disposed between a connecting terminal to be detected (the present embodiment takes connecting terminal 250 as an example) among a plurality of connecting terminals and one or more other connecting terminals. The short-circuit detection terminal 301d is arranged near the short-circuit detection terminals 301c at a preset distance. In the present embodiment, the connecting terminal 250 is taken as the connecting terminal to be detected (to make the figures brief, the reference signs of each of the connecting terminals are shown in FIG. 1c).

A short-circuit detection and processing unit 302 is respectively connected to the short-circuit detection terminals 301c and 301d (respectively corresponding to a first short-circuit detection terminal and a second short-circuit detection terminal), and judges presence of a short circuit by comparing a voltage on the short-circuit detection terminal 301c and a voltage on the short-circuit detection terminal 301d, and is in series connection between connecting terminals 210 and 240, for executing short-circuit abnormality processing. The short-circuit detection and processing unit can execute short circuit detection by using a field-effect transistor or a triode, and execute the short-circuit abnormality processing by using a field-effect transistor, a controllable switch, or a self-recovery fuse wire.

The figures only show an example in which only two short-circuit detection terminals are provided. One skilled person in the art should understand that there can be two or more than two short-circuit detection terminals. In this case, the short-circuit detection and processing unit is further electrically connected to the two or more than two short-circuit detection terminals, and judges presence of a short circuit between the connecting terminals on the ink cartridge chip by comparing the voltages on the two or more than two short-circuit detection terminals. For example, it is judged whether a potential difference between or among the two or more than two short-circuit detection terminals is less than or equal to a predetermined value, and if yes, it is determined that a short circuit is present between the connecting terminals of the ink cartridge chip.

A voltage division and power supply unit 303 is respectively connected to each of the short-circuit detection terminals 301c and 301d and the connecting terminal 250 to be detected, and supplies, through a voltage division circuit formed by a resistor or other elements, each of low voltages obtained through dividing a voltage applied on the connecting terminal 250 to be detected step-by-step to each of the short-circuit detection terminals 301c and 301d and the short-circuit detection and processing unit, respectively.

In the present embodiment, the voltage division and power supply unit divides a voltage of 42V applied on the connecting terminal 250 to obtain two low voltages ranging within 0V-38V and having a difference therebetween larger than or equal to 4V, and supplies the two low voltages to the corresponding short-circuit detection terminals 301c and 301d respectively, thereby supplying power to the short-circuit detection terminals 301c and 301d and the short-circuit detection and processing unit.

The short-circuit detection and processing unit judges presence of a short circuit between the short-circuit detection terminals 301c and 301d based on the potential difference on the short-circuit detection terminals 301c and 301d, and determines that the short circuit is present when the potentials on the short-circuit detection terminals 301c and 301d are equal to each other, and then executes the short-circuit abnormality processing.

Specifically, the short-circuit abnormality processing can be executed as follows. The connecting terminals 210 and 240 are disconnected from each other, which will cause the ink cartridge to return an abnormal response during installation detection because the connecting terminals 210 and 240 are installation detection connecting terminals, thereby prompting the printer to produce an error report. The short-circuit abnormality processing can also be sending a "short circuit signal" to the printer, for warning the printer to perform related processing. The short circuit signal may be signals such as an "error report" or a "short circuit message" recognizable to the printer.

One skilled person in the art should understand that, in the present embodiment, the short-circuit detection terminals can be arranged in an annular shape or in other regular or irregular shapes. The method and short-circuit detection method of chip provided in the present embodiment is not limited to aforesaid chips, ink cartridges, and recording devices, but is also applicable to other types of chips, image cartridges, and recording devices.

Embodiment 5

Figure 8:
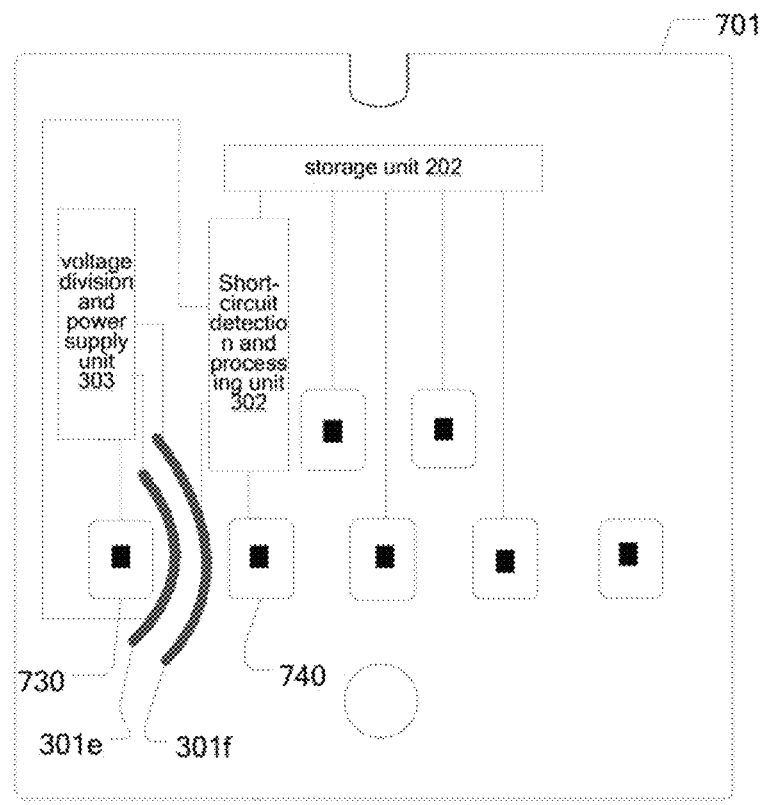
FIG. 8 schematically shows structure of a circuit of applying another short-circuit detection device of chip according to embodiments of the present disclosure to a seven-contact chip according to embodiment 2.

FIG. 8 schematically shows structure of a circuit of applying another short-circuit detection device of chip provided by the present embodiment to the seven-contact chip provided by embodiment 2. In the present embodiment, a connecting terminal 730 is taken as a connecting terminal to be detected (to make the figures brief, the reference signs of each of the connecting terminals are shown in FIG. 4c). In the present embodiment, when a short-circuit detection and processing unit determines that voltages on two short-circuit detection terminals (301f, 301e) are equal, it is determined that a short circuit is present between the connecting terminals of the ink cartridge chip, which will be described in detail as follows.

As shown in FIG. 8, in the present embodiment, two short-circuit detection terminals are provided. A short-circuit detection terminal 301f is arranged near the short-circuit detection terminal 301e at a preset distance, and both of the short-circuit detection terminals 301e and 301f are entirely or partially disposed between a connecting terminal 730 to be detected and one or more other connecting terminals on the circuit board 201.

A short-circuit detection and processing unit is respectively connected to the short-circuit detection terminals 301e and 301f, for detecting presence of a short circuit, and is in series connection between a connecting terminal 740 and a storage unit 702, for executing short-circuit abnormality processing. The short-circuit detection and processing unit can execute short circuit detection by using a field-effect transistor or a triode, and execute short-circuit abnormality processing by using a field-effect transistor, a controllable switch, or a self-recovery fuse wire.

A voltage division and power supply unit is respectively connected to the short-circuit detection terminals 301e and 301f and the connecting terminal 730, and divides a voltage and supplies power through a voltage division circuit formed by a resistor and other elements.

The voltage division and power supply unit in the present embodiment is preferably connected to a low-voltage connecting terminal and a storage unit. In this manner, when a short circuit is determined, a signal channel between the connecting terminal and the storage unit can be cut off, thereby preventing the storage unit from being applied a high-voltage signal, and thus protecting the storage unit and the ink cartridge.

In the present embodiment, the voltage division and power supply unit divides a voltage of 36V applied on the connecting terminal 730 to obtain two low voltages ranging within 0V-32V and having a voltage difference therebetween not lower than 4V, and then transmits the two low voltages respectively to the corresponding short-circuit detection terminals 301e and 301f, so as to supply power to the short-circuit detection terminals 301e and 301f and the short-circuit detection and processing unit. The short-circuit detection and processing unit judges presence of the short circuit between the short-circuit detection terminals 301e and 301f based on the potential difference of the short-circuit detection terminals 301e and 301f, and determines that a short circuit is present when the potentials of the short-circuit detection terminals 301e and 301f are equal, and then executes short-circuit abnormality processing. Specifically, the short-circuit abnormality processing may be as follows. The connecting terminal 740 is disconnected from the storage unit 702, and the signal channel between the connecting terminal and the storage unit is cut off so that the printer cannot receive a normal response signal and thus produce an error report. The short-circuit abnormality processing may also be sending a "short circuit signal" to the printer so as to warn the printer to execute related processing. The "short circuit signal" may be signals such as an "error report" or a "short circuit message" recognizable to the printer.

One skilled person in the art should understand that, in the present embodiment, the short-circuit detection terminals can be arranged in an annular shape or in other regular or irregular shapes. The method and short-circuit detection method of chip provided in the present embodiment is not limited to aforesaid chips, ink cartridges, and recording devices, but is also applicable to other types of chips, image cartridges, and recording devices.

Similarly, when more than two short-circuit detection terminals are provided, the short-circuit detection and processing unit can judge whether potentials of said more than two short-circuit detection terminals are equal to one another or not, and if yes, it is determined that a short circuit is present between the connecting terminals of the chip.

Embodiment 6

Figure 6:
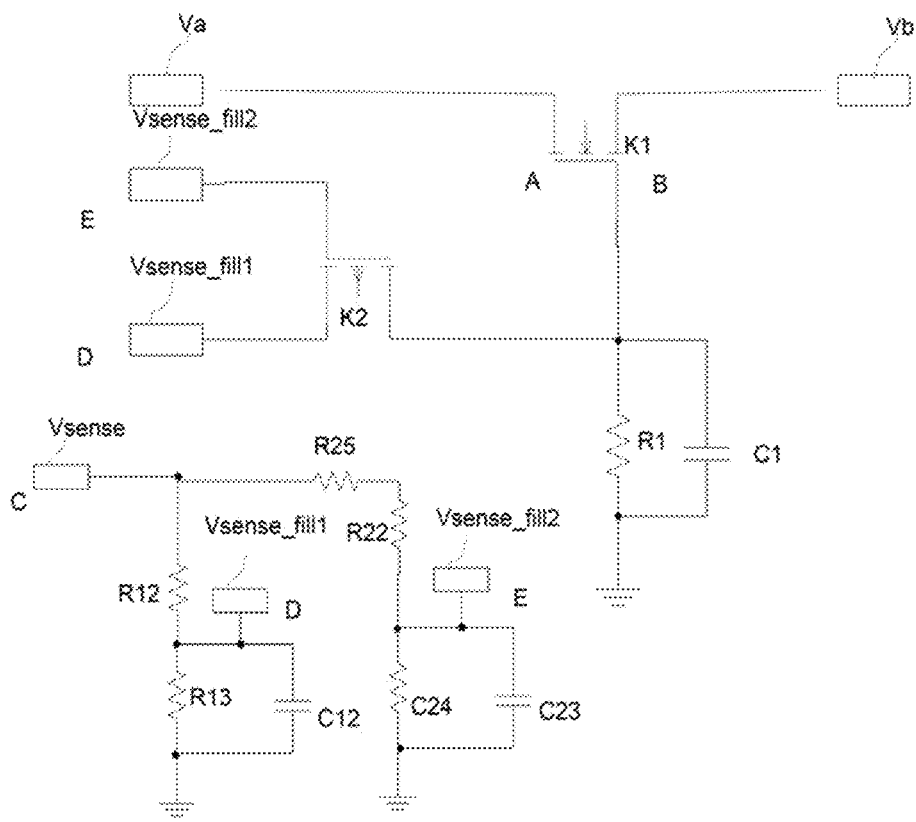
FIG. 6 schematically shows structure of a circuit of another short-circuit detection device of chip according to embodiments of the present disclosure.

FIG. 6 schematically shows structure of a circuit of another short-circuit detection device of chip according to the present embodiment. The two circuits respectively show circuit structure of a short-circuit detection and processing unit and circuit structure of a voltage division and power supply unit. One skilled person in the art should understand that said short-circuit detection device of chip can be formed of a hardware circuit.

As shown in FIG. 6, in the circuit, a terminal D is a first short-circuit detection terminal, and a terminal E is a second short-circuit detection terminal, and a terminal C is a connecting terminal to be detected. The terminal D and the terminal E may correspond respectively to the terminals 301c and 301d in FIG. 7, or to the short-circuit detection terminals 301e and 301f in FIG. 8. The terminal C may correspond to the connecting terminal 250 to be detected in FIG. 7, or to the connecting terminal 730 to be detected in FIG. 8. A short-circuit detection and processing unit comprises a detection unit and a controllable switch. The controllable switch comprises a first field-effect transistor K1 which is connected between A and B at an input end and an output end thereof. A and B respectively are other terminals of the chip controlled by the short-circuit detection and processing unit (e.g., the connecting terminals 210 and 240 in FIG. 7), or a connecting terminal and a storage unit controlled by the short-circuit detection and processing unit (e.g., the connecting terminal 740 and the storage unit 202 in FIG. 8). More specifically, the first field-effect transistor K1 may be connected to two connecting terminals other than the connecting terminal to be detected at the input end and the output end thereof, or to a connecting terminal other than the connecting terminal to be detected and the storage unit. The detection unit comprises a second field-effect transistor K2 which is connected to the short-circuit detection terminal E at a control end thereof, and to the connecting terminal D at an input end thereof. A control end of the first field-effect transistor K1 is connected to ground through a parallel circuit formed by a first resistor R1 and a first capacitor C1. The second field-effect transistor K2 is connected to the control end of the first field-effect transistor K1 at an output end thereof, and to a resistance-capacitance circuit formed by the parallel circuit constituted by the first resistor R1 and the first capacitor C1.

A voltage division and power supply unit comprises a first voltage division circuit and a second voltage division circuit which each are formed by a resistance-capacitance circuit or one or more resistors or other elements as long as they can function to divide a voltage. The first voltage division circuit divides a voltage from the connecting terminal to be detected, and supplies an obtained first low voltage to the first short-circuit detection terminal and the short-circuit detection and processing unit. The second voltage division circuit divides the voltage from the connecting terminal to be detected, and supplies an obtained second low voltage to the second short-circuit detection terminal and the short-circuit detection and processing unit.

For example, the first voltage division circuit may comprise a resistor R12, and a first resistance-capacitance circuit formed by a resistor R13 and a capacitor C12. The second voltage division circuit may comprise resistors R22 and R25, and a second resistance-capacitance circuit formed by a resistor R24 and a capacitor C23. The resistors R13 and R24 can have a same resistance. The capacitors C12 and C23 can be a same capacitor element. The resistors R12 and R22 can have a same or different resistance. The resistance of the resistors R12, R13, and R25, R22, R24 is in such a proportion that a voltage difference between the two low voltages obtained through the voltage division is not lower than 4V. The first resistance-capacitance circuit of the first voltage division circuit is connected to ground at one end thereof, and to the resistor R12 and the short-circuit detection terminal D respectively at the other end thereof. The second resistance-capacitance circuit of the second voltage division circuit is connected to ground at one end thereof, and to the resistor R22 and the short-circuit detection terminal E respectively at the other end thereof. The resistors R22 and R12 can have a same resistance. The resistor R22 is connected to the connecting terminal C to be detected through a resistor R25.

In the present embodiment, the first field-effect transistor K1 can be formed of NMOS (namely an N-type field-effect transistor), and the second field-effect transistor K2 can be formed of PMOS (namely a P-type field-effect transistor). As shown in FIG. 6, the voltage division and power supply unit divides a voltage Vsense applied on the connecting terminal C to be detected to obtain two low voltages Vsense_fill1 and Vsense_fill2, and supplies the low voltage Vsense_fill1 to the short-circuit detection terminal D, thereby supplying power to the short-circuit detection terminal D and the short-circuit detection and processing unit, and supplies the low voltage Vsense_fill2 to the short-circuit detection terminal E, thereby supplying power to the short-circuit detection terminal E and the short-circuit detection and processing unit. In the absence of a short circuit on the chip, the potential of Vsense_fill1 of the short-circuit detection terminal D is higher than the potential of Vsense_fill2 of the short-circuit detection terminal E; the second field-effect transistor K2 is in a conducting state; the short-circuit detection and processing unit does not detect occurrence of a short circuit; the input end and the output end of the first field-effect transistor K1 are electrically connected, i.e., the two installation detection connecting terminals A and B are connected to each other through the first field-effect transistor K1; and the chip works normally.

When a short circuit occurs on the short-circuit detection terminal D and E, i.e., when the connecting terminal D is shorted with the short-circuit detection terminal E, the potential of Vsense_fill1 of the short-circuit detection terminal D and the potential of Vsense_fill2 of the short-circuit detection terminal E are equal to each other; the second field-effect transistor K2 is in a cut-off state; the short-circuit detection and processing unit detects the occurrence of the short circuit; the input end and the output end of the first field-effect transistor K1 are disconnected from each other; and obviously, the connecting terminals A and B are not connected to each other, thereby causing the printer to produce an error report to warn a user to check the ink cartridge.

One skilled person in the art should understand that, in the present embodiment, the field-effect transistors can also be substituted with other switching elements such as triodes, self-recovery fuse wires, relays, or others as long as the circuit between the connecting terminals can be controlled to be cut off. A series resistor formed by a fourth resistor and a second resistor can also be substituted with a resistor with a same resistance.

Embodiment 7

A short-circuit detection and processing unit of a short-circuit detection device of chip provided by the present embodiment is a variation of the short-circuit detection and processing unit of the short-circuit detection device of chip provided by the embodiment 3.

Figure 9:
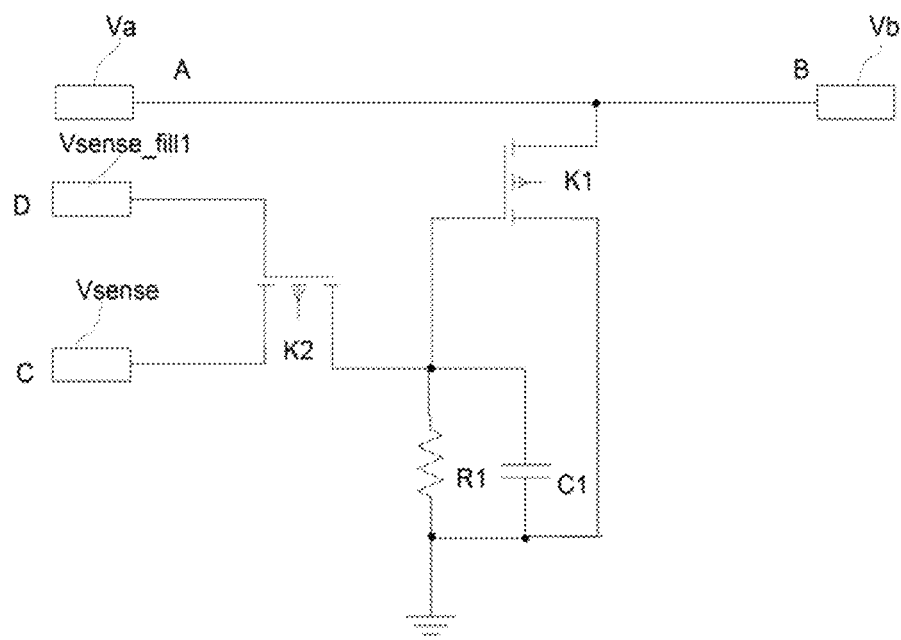
FIG. 9 schematically shows structure of a circuit of a short-circuit detection and processing unit of a short-circuit detection device of chip according to embodiment 7 of the present disclosure.

FIG. 9 schematically shows structure of a circuit of a short-circuit detection and processing unit of a short-circuit detection device of chip provided by the present embodiment. The circuit of the short-circuit detection and processing unit provided by the present embodiment and shown in FIG. 9 differs from that of the short-circuit detection and processing unit provided by embodiment 3 and shown in FIG. 5 in the connection approach of the first filed-effect transistor K1. In the present embodiment, the first filed-effect transistor K1 is connected to terminals A and B at an input end thereof, and to the ground at an output end thereof.

As shown in FIG. 9, in the short-circuit detection and processing unit, the terminals A and B are other terminals or electrical elements of a chip which is in series connection to the short-circuit detection and processing unit. The first filed-effect transistor K1 is connected to the terminals A and B at the input end thereof, to the ground at the output end thereof, and to the ground at a control end thereof through a parallel circuit formed by a first resistor R1 and a first capacitor C1. Other parts of the circuit of the short-circuit detection and processing unit is the same as that of the short-circuit detection and processing unit provided by embodiment 3 and shown in FIG. 5, or provided by embodiment 6 and shown in FIG. 6.

A voltage division and power supply unit of the short-circuit detection device of chip provided by the present embodiment can be the voltage division and power supply unit of the short-circuit detection device of chip provided by embodiment 3.

One skilled in the art should understand that said short-circuit detection device of chip can be formed of a hardware circuit.

In the present embodiment, the first field-effect transistor K1 and the second field-effect transistor K2 can be formed of PMOS (namely a P-type field-effect transistor). A voltage on a connecting terminal C is marked as Vsense, and a voltage on a connecting terminal D is marked as Vsense_fill1.

As shown in FIG. 9, the voltage on the connecting terminal C is Vsense, and the voltage on the connecting terminal D is Vsense_fill1. In the absence of a short circuit on the chip, i.e., when the connecting terminal C is not shorted with the short-circuit detection terminal D, the potential of Vsense of the connecting terminal C is higher than the potential of Vsense_fill1 of the short-circuit detection terminal D; the second field-effect transistor K2 is in a conducting state; the short-circuit detection and processing unit does not detect occurrence of a short circuit; the second field-effect transistor K2 connects a high voltage on the connecting terminal C with the control end of the first field-effect transistor K1; the input end and the output end of the first field-effect transistor K1 are disconnected from each other, i.e., the two terminals A and B are not connected to the ground through the first field-effect transistor K1 to decrease the voltage; and consequently, the chip works normally.

When a short circuit occurs on the chip, i.e., when the connecting terminal C is shorted with the short-circuit detection terminal D, the potential Vsense of the connecting terminal C is equal to the potential Vsense_fill1 of the short-circuit detection terminal D; the second field-effect transistor K2 is in a cut-off state; the short-circuit detection and processing unit determines that the short circuit is present and executes short-circuit abnormality processing; the second field-effect transistor K2 does not connect the high voltage on the connecting terminal C with the control end of the first field-effect transistor K1; the input end and the output end of the first field-effect transistor K1 are electrically connected to each other, i.e., the two terminals A and B are connected to the ground through the first field-effect transistor K1 so that the voltage is decreased, thereby causing the printer to produce an error report.

One skilled in the art should understand that the short-circuit detection and processing unit provided by the present embodiment is also applicable to the short-circuit detection device of chip provided by embodiment 6 of the present disclosure.

One skilled in the art should understand that, when the short-circuit detection and processing unit executes the short-circuit abnormality processing, the two terminals A and B are connected to the ground through the first field-effect transistor K1 so that potentials of the terminals A and B are decreased, thereby preventing the chip from being damaged due to a high voltage caused by the short circuit between the connecting terminal C and terminal A or terminal B, and thus causing the printer to produce an error report through decreasing a potential of a conducting circuit. In the present embodiment, to connect the two terminals A and B with the ground is not a necessary technical means, and there can be other technical means as long as they can decrease the potential to prevent the chip from being damaged and cause the printer to produce an error report.

One skilled in the art should understand that, the electrical connections among the voltage division and power supply unit, the short-circuit detection and processing unit, and the short-circuit detection terminal are not limited to the connection approaches as provided in embodiments 1 to 7. The voltage division and power supply unit may also be directly connected to the short-circuit detection and processing unit so as to supply power to the short-circuit detection and processing unit. The short-circuit detection terminal can be connected to the voltage division and power supply unit or the short-circuit detection and processing unit, and is arranged as such that occurrence of a short circuit on the short-circuit detection terminal and the connecting terminal to be detected will affect the work of the short-circuit detection and processing unit or the power supply by the voltage division and power supply unit, so that the short-circuit detection and processing unit can detect the short circuit and execute short-circuit abnormality processing.

According to the connection approaches provided by embodiments 1 to 7, the voltage division and power supply unit is connected to the short-circuit detection terminal and the short-circuit detection and processing unit, so as to supply power not only to the short-circuit detection terminal, but also to the short-circuit detection and processing unit through voltage division, thereby finishing the short-circuit detection of chip.

Figure 11:
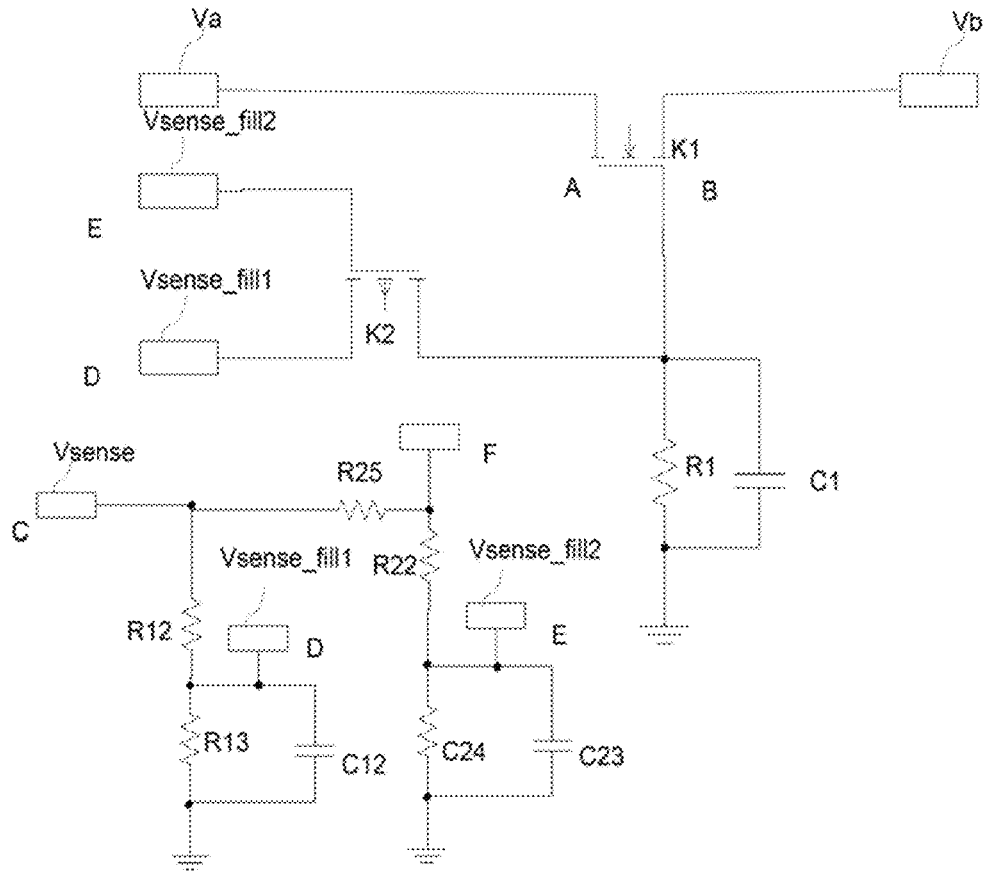
FIG. 11 schematically shows structure of a circuit of the short-circuit detection device of chip according to embodiments of the present disclosure.

In addition, structure of the circuit as shown in FIG. 11 is substantially the same as that of the circuit in FIG. 6. But in the circuit as shown in FIG. 11, the terminals D and E of the voltage division and power supply unit are connected to the terminals D and E of the short-circuit detection and processing unit, for supplying power to the short-circuit detection and processing unit. The first short-circuit detection terminal is disposed on the terminal C, and the second short-circuit detection terminal is disposed on the terminal F which is between the resistors R25 and R22. The resistors R12 and R22 are the same, and R13, R24 are the same. The capacitors C12 and C23 are the same. When short circuits occur on the two short-circuit detection terminals, the two divided voltages Vsense_fill1 and Vsense_fill2 are equal to each other; the second filed-effect transistor K2 is cut-off; the short-circuit detection and processing unit detects occurrence of the short circuit, and executes the short-circuit abnormality processing; the first filed-effect transistor K1 is cut-off; and terminals A and B are disconnected from each other. In the circuit as shown in FIG. 11, the short-circuit detection terminal is connected to the voltage division and power supply unit, and occurrence of the short circuit between the short-circuit detection terminal and the connecting terminal to be detected will affect the power supply by the voltage division and power supply unit, so that the short-circuit detection and processing unit can detect the short circuit and execute the short-circuit abnormality processing.

Besides, the short-circuit detection terminal can be directly connected to the short-circuit detection and processing unit. The voltage division and power supply unit supplies power to the short-circuit detection and processing unit, so that the short-circuit detection and processing unit can work normally. The short circuit of the short-circuit detection terminal can affect the work of the short-circuit detection and processing unit, and therefore can be detected by the short-circuit detection and processing unit, and then the short-circuit detection and processing unit executes the short-circuit abnormality processing.

Embodiment 8

Figure 10:
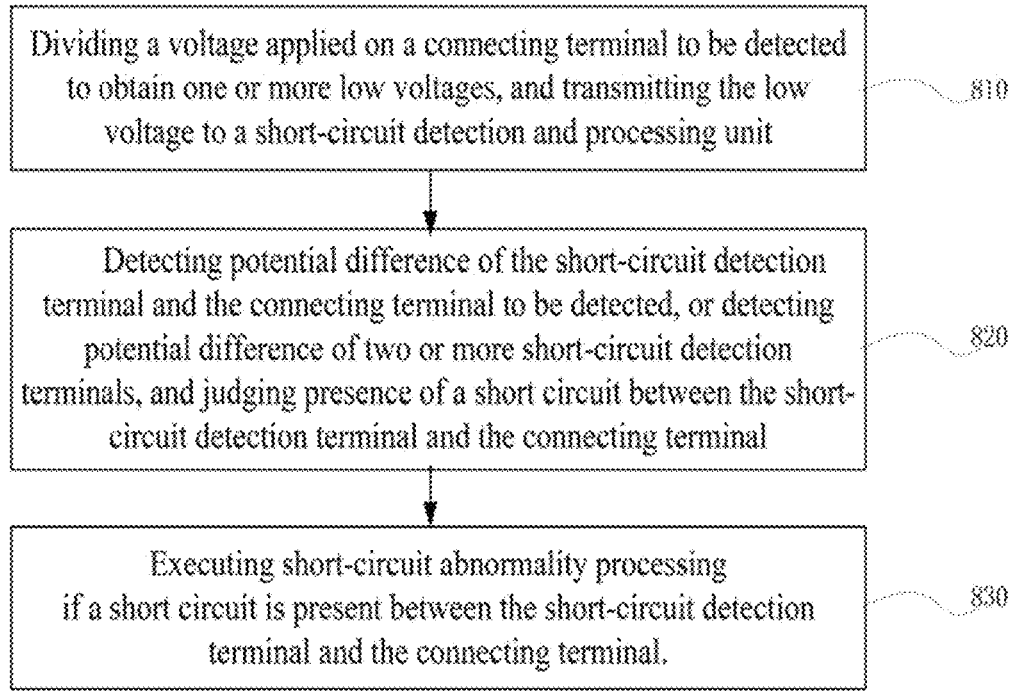
FIG. 10 is a flow chart of a short-circuit detection method of chip according to embodiment 8 of the present disclosure.

FIG. 10 is a flow chart of a short-circuit detection method of chip provided by the present embodiment. The method can be implemented based on the chip provided by the preceding embodiments. The chip is provided thereon with at least two connecting terminals, including a low-voltage connecting terminal and a high-voltage connecting terminal. The chip comprises a short-circuit detection device of chip which comprises one or more short-circuit detection terminals, a short-circuit detection and processing unit, and a voltage division and power supply unit. The functions of the elements and connections among them have been described in detail in the preceding embodiment, and therefore will not be described again.

The short-circuit detection method of chip comprises the following steps.

In step S810, a voltage applied on a connecting terminal to be detected is divided to obtain one or more low voltages, and the low voltage is transmitted to the short-circuit detection and processing unit.

Step S810 is able to achieve a low-cost and long-term use method of short-circuit detection method of chip. Further, the short-circuit detection of chip can be executed through steps S820 and S830.

In step S820, presence of a short circuit between the short-circuit detection terminal and the connecting terminal is judged by detecting potential difference of the short-circuit detection terminal and the connecting terminal to be detected, or by detecting potential difference of two or more than two of the short-circuit detection terminals.

In step S830, if the short circuit between the short-circuit detection terminal and the connecting terminal is determined, short-circuit abnormality processing will be executed.

According to the chips provided by the preceding claims 1 and 4, the ink cartridge is provided with two types of electrical elements, which are the first electrical element and the second electrical element, respectively. A driving voltage of the first electrical element is lower than that of the second electrical element. Two types of connecting terminals are provided, and the two types of connecting terminals are low-voltage connecting terminals connected to the first electrical element, and high-voltage connecting terminals connected to the second electrical element, respectively. The short-circuit detection terminal is disposed between a first connecting terminal and a second connecting terminal. Two connecting terminals are provided. A controllable switch is in series connection between two installation detection connecting terminals of the first type. When the short circuit between the short-circuit detection terminal and the connecting terminal is determined, short-circuit abnormality processing as follows will be executed: When it is detected that a short circuit is present between the short-circuit detection terminal and the connecting terminal, the controllable switch is switched off so as to change an installation signal transmitted by the installation detection connecting terminal to the body of the recording device.

According to the chips provided by the preceding claims 2 and 5, the ink cartridge is provided with two types of electrical elements, which are the first electrical element and the second electrical element, respectively. The driving voltage of the first electrical element is lower than that of the second electrical element. Two types of connecting terminals are provided, and the two types of connecting terminals are the low-voltage connecting terminals connected to the first electrical element, and the high-voltage connecting terminals connected to the second electrical element, respectively. The short-circuit detection terminal is disposed between the first connecting terminal and the second connecting terminal. At least two connecting terminals are provided. The controllable switch is in series connection between the low-voltage connecting terminal and the storage unit. When the short circuit between the short-circuit detection terminal and the connecting terminal is determined, the short-circuit abnormality processing as follows will be executed: When it is detected that a short circuit is present between the short-circuit detection terminal and the connecting terminal, the controllable switch is switched off so as to change the connection state of the storage unit.

When it is detected that a short circuit is present between the short-circuit detection terminal and the connecting terminal, approaches of executing the short-circuit abnormality processing are not limited to the above preferred ones. For example, when the short circuit between the short-circuit detection terminal and the connecting terminal is determined, a detection result or a signal indicating the error can be sent to the body of the recording device by means of the connecting terminal, or a signal transmission channel between the chip and the body of the recording device can be cut off.

Obviously, by adopting the technical solutions provided by the embodiments of the present disclosure, short circuit can be detected automatically by the ink cartridge chip side once the ink cartridge is mounted into the recording device, which reduces the possibility that the storage unit in the ink cartridge has already been damaged when the short circuit is detected by the recording device. Besides, for recording devices that are not provided with a short-circuit detection circuit, the safety factor of using the ink cartridge is also increased. Moreover, compared with supply power by the battery to the short-circuit detection circuit according to the existing technologies, to divide voltage by the voltage division and power supply unit and then transmit the obtained low voltage to the short-circuit detection and processing unit is able to effectively reduce the cost, solve the problem that the short circuit detection cannot be performed after the battery runs out, and enables the chip to be used for a long time, and therefore, is more durable.

One skilled in the art should understand that the embodiments of the above methods can be implemented completely or partially by hardware related to programs and instructions. Said programs can be stored in a readable storage media of a computer, and can be executed based on the steps of the methods provided in the above embodiments. Said storage media may be media such as ROM, RAM, diskette, or disks which can store program codes.

It should be noted that the embodiments above are intended only for illustrating, rather than restricting the technical solutions of the present disclosure. The present disclosure are described in detail with reference to the above embodiments, but it should be noted that anyone skilled in the art can make amendments to the technical solutions described in the above embodiment, or substitute these technical features partly or completely with equivalents thereof, without departing from the spirit and scope of the present disclosure.

The above embodiments are disclosed only for better illustrating, rather than restricting the present disclosure. Anyone skilled in the art can make amendments to the implementing forms or details without departing from the spirit and scope of the present disclosure. The scope of the present disclosure should still be subject to the scope defined in the claims.

The invention claimed is:

1. An ink cartridge chip, detachably mounted on an ink cartridge and comprising:
   a circuit board, wherein the circuit board is provided with at least three connecting terminals in contact connection with device-side terminals of a recording device when the ink cartridge chip is mounted to the recording device, the at least three connecting terminals comprise at least one first connecting terminal connected with a storage element provided on the circuit board, at least one second connecting terminal applied with a high drive voltage, and at least one installation detecting connecting terminal for detecting the ink cartridge mounting condition by the recording device; and
   at least one detecting terminal, arranged between the at least one second connecting terminal and the at least one installation detecting connecting terminal, configured to detect whether a short circuit occurs between the at least one detecting terminal and the at least one installation detecting connecting terminal or the at least one second connecting terminal, wherein the at least one detecting terminal is not in physical contact connection with the device-side terminals of the recording device.

2. The ink cartridge chip according to claim 1, further comprising a short-circuit detection and processing unit:
   electrically connected with the at least one detecting terminal and/or the at least one installation detecting connecting terminal, configured to judge whether short circuit occurs between the at least one detecting terminal and the at least one installation detecting connecting terminal according to a change in an electrical signal of the at least one detecting terminal and/or the at least one installation detecting connecting terminal; or electrically connected with the at least one detecting terminal and/or the at least one second connecting terminal, configured to judge whether short circuit occurs between the at least one detecting terminal and the at least one second connecting terminal according to a change in an electrical signal of the at least one detecting terminal and/or the at least one second connecting terminal, wherein short-circuit abnormality processing is executed if a short circuit is determined.

3. The ink cartridge chip according to claim 2, wherein: the short-circuit detection and processing unit causes the recording device to prompt an error when short circuit is detected.

4. The ink cartridge chip according to claim 2, wherein: a number of the installation detecting connecting terminals is two, the short-circuit detection and processing unit is connected in series between the two installation detecting connecting terminals, to connect the two installation detection connecting terminals to the ground, when a short circuit is determined.

5. The ink cartridge chip according to claim 1, wherein: the at least one detecting terminal has no voltage or has a fixed voltage value in an initial state.

6. The ink cartridge chip according to claim 1, wherein: the at least one detecting terminal is annular in shape, surrounding an external side of the at least one second connecting terminal, and maintaining a predetermined interval from the at least one second connecting terminal.

7. The ink cartridge chip according to claim 1, wherein: the at least one detecting terminal has a curved shape.

8. An ink cartridge, comprising an ink cartridge body and an electrical component, further comprising the ink cartridge chip according to claim 1, wherein the electrical component is arranged on the circuit board of the ink cartridge chip and/or the ink cartridge body.

9. An ink cartridge chip, detachably mounted on an ink cartridge and comprising:
a circuit board, wherein the circuit board is provided with at least three connecting terminals in contact connection with device-side terminals of a recording device when the ink cartridge chip is mounted to the recording device, the at least three connecting terminals comprise at least one first connecting terminal connected with a storage element provided on the circuit board, at least one second connecting terminal applied with a high drive voltage, and at least one installation detecting connecting terminal for detecting the ink cartridge mounting condition by the recording device; and
at least one detecting terminal, arranged between the at least one second connecting terminal and the at least one installation detecting connecting terminal, configured to detect whether a short circuit occurs between the at least one detecting terminal and the at least one installation detecting connecting terminal or the at least one second connecting terminal;
a short-circuit detection and processing unit:
electrically connected with the at least one detecting terminal and/or the at least one installation detecting connecting terminal, configured to judge whether short circuit occurs between the at least one detecting terminal and the at least one installation detecting connecting terminal according to a change in an electrical signal of the at least one detecting terminal and/or the at least one installation detecting connecting terminal; or
electrically connected with the at least one detecting terminal and/or the at least one second connecting terminal, configured to judge whether short circuit occurs between the at least one detecting terminal and the at least one second connecting terminal according to a change in an electrical signal of the at least one detecting terminal and/or the at least one second connecting terminal, wherein short-circuit abnormality processing is executed if a short circuit is determined; and
a voltage division and power supply unit connected with the short-circuit detection and processing unit and at least one second connecting terminal for dividing a voltage from at least one second connecting terminal and transmitting an obtained low voltage to the short-circuit detection and processing unit.

10. The ink cartridge chip according to claim 9, wherein: the at least one detecting terminal has no voltage or has a fixed voltage value in an initial state.

11. The ink cartridge chip according to claim 9, wherein: the at least one detecting terminal is annular in shape, surrounding an external side of the at least one second connecting terminal, and maintaining a predetermined interval from the at least one second connecting terminal.

12. The ink cartridge chip according to claim 9, wherein: the at least one detecting terminal has a curved shape.

13. The ink cartridge chip according to claim 9, wherein: a number of the installation detecting connecting terminals is two, the short-circuit detection and processing unit is connected in series between the two installation detecting connecting terminals, to connect the two installation detection connecting terminals to the ground, when a short circuit is determined.

14. An ink cartridge, comprising an ink cartridge body and an electrical component, further comprising the ink cartridge chip according to claim 9, wherein the electrical component is arranged on the circuit board of the ink cartridge chip and/or the ink cartridge body.

* * * * *